(12) United States Patent
Gorsica et al.

(10) Patent No.: US 8,265,717 B2
(45) Date of Patent: Sep. 11, 2012

(54) IMPLEMENTATION OF TOUCHPAD ON REAR SURFACE OF SINGLE-AXIS HINGED DEVICE

(75) Inventors: John J. Gorsica, Round Lake, IL (US); William G. Kastritis, Algonquin, IL (US); Michael J. Lombardi, Lake Zurich, IL (US); Ross W. Ripley, Gurnee, IL (US); Michael Spence, Libertyville, IL (US); Marjorie M. Ollayos, Libertyville, IL (US); Amber M. Pierce, Libertyville, IL (US); Frank H. Stone, Waukegan, IL (US)

(73) Assignee: Motorola Mobility LLC, Libertyville, IL (US)

( * ) Notice: Subject to any disclaimer, the term of this patent is extended or adjusted under 35 U.S.C. 154(b) by 404 days.

(21) Appl. No.: 12/492,369

(22) Filed: Jun. 26, 2009

(65) Prior Publication Data
US 2010/0328250 A1 Dec. 30, 2010

(51) Int. Cl.
*G06F 3/045* (2006.01)
(52) U.S. Cl. ............... 455/575.3; 455/575.1; 455/550.1; 345/174
(58) Field of Classification Search .......... 455/566–575, 455/550.1; 361/600, 679; 379/433
See application file for complete search history.

(56) References Cited

U.S. PATENT DOCUMENTS

| 5,128,671 | A | 7/1992 | Thomas, Jr. |
| 5,543,588 | A | 8/1996 | Bisset et al. |
| 5,610,971 | A | 3/1997 | Vandivier |
| 5,729,219 | A | 3/1998 | Armstrong et al. |
| 5,896,575 | A | 4/1999 | Higginbotham et al. |
| 5,959,260 | A | 9/1999 | Hoghooghi et al. |
| 6,020,878 | A | 2/2000 | Robinson |
| 6,201,554 | B1 | 3/2001 | Lands |
| 6,392,870 | B1 | 5/2002 | Miller, Jr. |
| 6,466,198 | B1 | 10/2002 | Feinstein |
| 6,597,347 | B1 | 7/2003 | Yasutake |

(Continued)

FOREIGN PATENT DOCUMENTS

EP    0 913 977 A2    5/1999

(Continued)

OTHER PUBLICATIONS

Patent Cooperation Treaty, "PCT International Search Report and Written Opinion of the International Search Authority" for International Application No. PCT/US2010/040876, International Filing Date Jul. 2, 2010 (mailed Oct. 6, 2010).

(Continued)

*Primary Examiner* — Kamran Afshar
*Assistant Examiner* — Kashif Siddiqui

(57) ABSTRACT

An improved mobile electronic device 100 with a unique thin and cost-effective form and design can have a large display 170 and a large full qwerty keypad 138 on the outward surface and can have a capacitive touchpad 186 on the inward surface of the flip 102 or slide that facilitates navigation on the display and can detect and recognize the flip or slide position within the mobile electronic device. A pattern of capacitive traces or wires 202 can be laid out within the layers of a printed circuit board to detect a user's finger gestures without enlarging or adversely impacting the size of the mobile electronic device. The attractive mobile electronic device can also provide for the use of a speaker port 196 underneath a removable battery door 194 and a way to seal a port under a battery door for audio enhancement.

19 Claims, 8 Drawing Sheets

U.S. PATENT DOCUMENTS

| | | | |
|---|---|---|---|
| 6,927,747 B2 | 8/2005 | Amirzadeh et al. | |
| 7,075,513 B2 | 7/2006 | Silfverberg et al. | |
| 7,205,959 B2 | 4/2007 | Henriksson | |
| 7,218,313 B2 | 5/2007 | Marcus et al. | |
| 7,630,491 B1 * | 12/2009 | Uyehara | 379/433.02 |
| 2003/0184528 A1 | 10/2003 | Kawasaki et al. | |
| 2003/0199290 A1 | 10/2003 | Viertola | |
| 2003/0234768 A1 | 12/2003 | Rekimoto et al. | |
| 2004/0169624 A1 | 9/2004 | Yamazaki et al. | |
| 2004/0176047 A1 * | 9/2004 | Trively | 455/90.3 |
| 2004/0263056 A1 | 12/2004 | Seo et al. | |
| 2005/0020325 A1 | 1/2005 | Enger et al. | |
| 2005/0024339 A1 | 2/2005 | Yamazaki et al. | |
| 2005/0096106 A1 | 5/2005 | Bennetts et al. | |
| 2006/0017711 A1 | 1/2006 | Pihlaja | |
| 2006/0092355 A1 | 5/2006 | Yang et al. | |
| 2006/0146483 A1 * | 7/2006 | Patino et al. | 361/600 |
| 2006/0197750 A1 | 9/2006 | Kerr et al. | |
| 2006/0284853 A1 | 12/2006 | Shapiro | |
| 2007/0074915 A1 | 4/2007 | Chung et al. | |
| 2007/0075915 A1 | 4/2007 | Cheon et al. | |
| 2007/0097151 A1 | 5/2007 | Rosenberg | |
| 2007/0103454 A1 | 5/2007 | Elias | |
| 2007/0177803 A1 | 8/2007 | Elias et al. | |
| 2008/0211783 A1 | 9/2008 | Hotelling et al. | |
| 2008/0261661 A1 | 10/2008 | Jessop | |
| 2009/0066660 A1 | 3/2009 | Ure | |
| 2009/0096749 A1 | 4/2009 | Kawahara et al. | |
| 2009/0131117 A1 * | 5/2009 | Choi | 455/566 |
| 2009/0140863 A1 | 6/2009 | Liu et al. | |
| 2009/0241048 A1 | 9/2009 | Augustine et al. | |
| 2009/0298547 A1 | 12/2009 | Kim et al. | |
| 2009/0315834 A1 | 12/2009 | Nurmi et al. | |
| 2010/0113100 A1 | 5/2010 | Harmon et al. | |

FOREIGN PATENT DOCUMENTS

| | | | |
|---|---|---|---|
| EP | 1408400 | A2 | 4/2004 |
| EP | 2065786 | A1 | 6/2009 |
| GB | 2339505 | A1 | 1/2000 |
| GB | 2368483 | A1 | 5/2002 |
| JP | 05324122 | | 12/1993 |
| WO | 9838822 | | 9/1998 |
| WO | 2008030563 | A2 | 3/2008 |

OTHER PUBLICATIONS

Patent Cooperation Treaty, "PCT Invitation to Pay Additional Fees and, Where Applicable, Protest Fee and Communication Relating to the Results of the Partial International Serach" for International Application No. PCT/US2010/037568, International Filing Date Jun. 7, 2010 (mailed Sep. 23, 2010).

Publication: "Lucidtouch Multi-Touch Transparent Mobile Device" published by lucid touch microsoft research, Mar. 10, 2008.

U.S. Appl. No. 12/505,775 for a Method for Implementing Zoom Functionality on a Portable Device with Opposing Touch Sensitive Surfaces, filed Jul. 20, 2009.

International Application No. PCT/FI2004/000381, filed Jun. 23, 2004, International Publication No. WO 2004/114636 A1, published Dec. 29, 2004, of Nokia Corporation, of inventors Mantysalo et al., pertains to a Multifunctional UI Input Device for Mobile Terminals.

Publication Gerry Chu et al., "Lucid Touch prototype" published by lucid touch microsoft research & mitsubishi electric research labs. Nov. 26, 2008.

Publication: Illustration of GPS system, published by lucid touch microsoft research & mitsubishi electric research labs. Nov. 26, 2008.

ERH-L1 (Early) Shen et al.: "Double-side Multi-touch Input for Mobile Device", CHI 2009-Digital Life, New World: Conference Proceedings and Extended Abstracts; The 27th Annual CHI Conference on Human Factors in Computing Systems, Apr. 4-9, 2009, In Boston, USA, ACM Association for Computing Machinery, US Apr. 4, 2009, pp. 4339-4344.

Daniel Wigdor et al: "Lucid touch: a see-through mobile device", UIST 2007, Proceedings of the 20th, Annual ACM Symposium on User Interface Software and Technology, October 7-10, 2007, Newport, Rhode Island, USA; [ACM Symposium on User Interface Software and Technology], New York, NY: ACM, US Oct. 7, 2007, pp. 269-278.

* cited by examiner

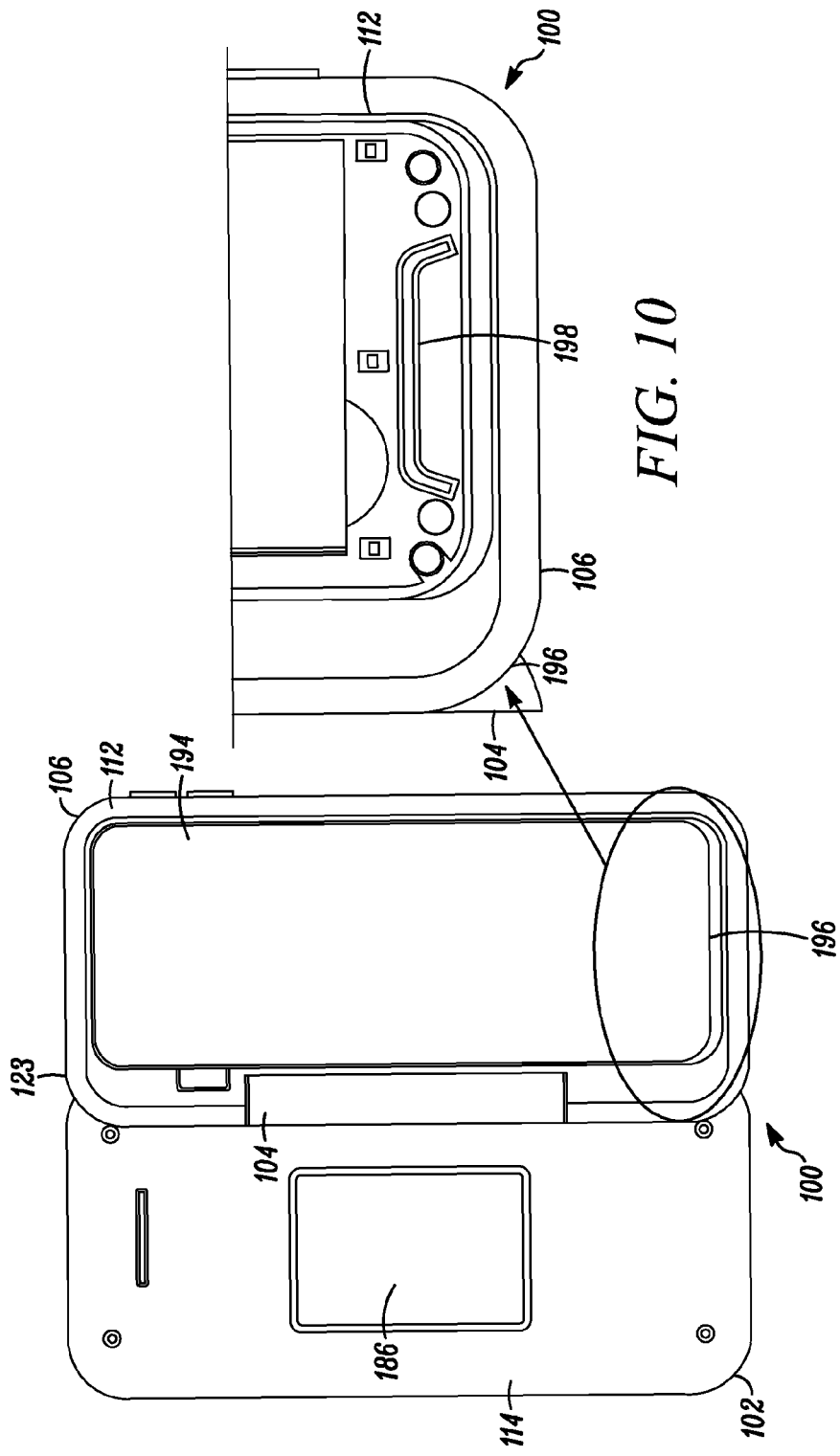

IMPLEMENTATION OF TOUCHPAD ON REAR SURFACE OF SINGLE-AXIS HINGED DEVICE

BACKGROUND OF THE INVENTION

1. Field of the Disclosure

The disclosure relates in general to mobile devices, and more particularly, to mobile electronic devices with an electronic display and a keyboard. In certain embodiments, the mobile electronic device comprises a mobile telephone, but the disclosure is not limited to mobile telephones.

2. Background Art

There is a significant market for mobile electronic devices with large displays coupled with large, full qwerty keypads, as well as, a unique, thin, and cost-effective mobile electronic device with a keypad on the back of a clamshell device and a single display on the front of the device.

The market also desires a familiar navigation method for utilizing the display. Traditional solutions such as 5-way dome layouts, joysticks, or trackballs require significant X, Y, or Z space and often cause reliability issues.

Previously, a touch interface has been placed on the back of a mobile device with a tablet form factor. The drawback to this implementation is potential unintended actuation and no physical keypad on which to enter text. Also, in the past porting implementations or speaker holes in conventional mobile electronic devices have typically been unattractive visible holes in the housing. Furthermore, a flip or slider-detect function can be accomplished through the use of a hall-effect sensor and magnet positioned in opposing halves of a conventional mobile electronic device.

It is therefore, desirable to provide an improved mobile electronic device which overcomes most, if not all, of the preceding problems.

SUMMARY OF THE INVENTION

An improved mobile electronic device with a unique, thin and cost-effective form and design is provided that is user-friendly, reliable, fun and effective. The attractive mobile electronic device can have a large display and a large full qwerty keypad on the outward surface and can have a capacitive touchpad on the inward surface of the flip or slide that facilitates navigation on the display and can detect and recognize the flip or slide and the orientation of the mobile electronic device. The multi-functional mobile electronic device is easy to use, comfortable and economical.

The mobile electronic device can be a radiotelephone, a cellular (cell) phone, a mobile phone, smart phone, flip phone, slider phone, portable networking device, qwerty flip device, wireless device, portable gaming device, mobile communications device, personal digital assistant (PDA), wireless e-mail device, a two way pager, internet communication device, hand held electronic device, or combinations of the preceding. Desirably, the mobile electronic device is of a compact size for readily fitting in a shirt pocket, pants pocket, suit pocket, and/or purse.

The mobile electronic device can have a touchpad or touch-detecting surface on the rear of a flip or slide device for use as input mechanism. This provides a natural location of pointer fingers when holding the base of the mobile electronic device, so that the user does not need to block the display comprising a touchscreen to navigate and select items on the touchscreen, nor does the user need navigation keys on the keypad in the base.

The touchpad or touch-detecting surface can detect when the other half of the mobile electronic device is near it by detecting change in capacitance from the metal housing. This reduces cost of flip/slide detection because the touch surface is used for this additional function. The mobile electronic device is more reliable as it does not rely on a magnetic switch.

The mobile electronic device can have a touchpad sensor integrated into the printed circuit board (PCB) of the flip or slide, which can also be used for other functions such as an earpiece speaker and/or a display connection. Advantageously, the touch surface can be implemented without adding the cost of a standalone sensor. The size of the mobile electronic device is not increased because the PCB thickness is already present for other electrical functions.

This invention can utilize the rear surface of the flip portion of the mobile electronic device for user interface (UI) navigation. When the mobile electronic device is fully opened, a capacitive or resistive touchpad is positioned on the inward surface of the flip or slide directly behind the display in the outward surface of the flip or slider portion of the mobile electronic device. When the touchpad is touched by the user, the motion of the finger translates to motion within the UI on the forward facing display. This can include highlighting different web links or scrolling through text. It can also include implementing a mouse cursor on the UI which follows the motion of a user's finger on the back of the mobile electronic device.

The capacitive/resistive touch, cursor functionality, and blind navigation techniques in this form for the mobile electronic device is unique and offers many advantages. The X/Y touchpad on the inward surface or rear of the flip prevents the user from having to block the display screen on the outward surface of the flip when navigating as they would when using the touchscreen. The position in the flip prevents unintentional actuation since the user will hold the base and the touchpad is hidden when the flip or slider is closed. Furthermore, the use of this location for a touchpad for a navigation solution eliminates the need for a navigation device on the main keypad which opens space on the keypad for additional functional keys or reducing the X/Y size needed for the keypad.

Furthermore, in conjunction with a metal surface on the inside of the transceiver half (base) of the mobile electronic device, the capacitive touchpad could be utilized as a flip or slider detect mechanism. In the closed position, the touchpad on the back or inward surface of the flip or slider, can contact or come into close proximity with a metal battery door or other feature on the inside surface of the base and can be detected by the capacitive touch controller of the touchpad. When the flip or slider is opened, the proximity of metal is removed and the mobile electronic device recognizes the open state.

Moreover, by placing a printed circuit board (PCB) in the flip assembly, a pattern of copper traces or wires can be laid out to detect a user's finger gestures without enlarging or adversely impacting the size of the mobile electronic device. This allows for an additional input and functions with no additional cost for a sensor.

A unique mobile electronic device is provided with a novel form factor in which capacitive/resistive touch, cursor functionality, and blind navigation techniques are implemented and offer specific advantages. The X/Y touchpad on the rear of the flip prevents the user from having to block the touchscreen display when navigating as they would when using the touchscreen. The position in the flip prevents unintentional actuation since the user will hold the base and the touchpad is hidden when the flip is closed. Also, the use of this location for a navigation solution eliminates the need for a navigation device on the main keypad and provides space for additional functional keys or reducing the X/Y size needed for the main keypad.

The additional use of the touchpad for a flip detect mechanism, is unique and advantageous compared to the mechanical switches or hall-effect-based magnetic switches used in conventional hinged products. This re-use of the navigation pad can be less expensive compared to a magnetic switch implementation.

The mobile electronic device utilizes the rear surface of the flip portion of the mobile electronic device for user interface navigation. When the mobile electronic device is fully opened a capacitive or resistive touchpad can be positioned behind the display in the flip portion of the mobile electronic device. When the pad is touched by the user, the motion of the finger translates to motion within the user interface (UI) on the forward facing display. This can include highlighting different web links or scrolling through text. It can also include implementing a mouse cursor on the UI which follows the motion of a user's fingers on the back of the mobile electronic device.

The inventive mobile electronic device can also provide for the use of a speaker port underneath a removable battery door and a way to seal a port under a battery door for audio enhancement. A speaker port has never been done this way before. Most speaker ports are visible on the outside surface of the device. This speaker port can be hidden. It is not usually possible to port sound underneath a surface with good audio without such a seal.

The invention also discloses a way to port sound with good audio where the port is hidden. With the mobile electronic device closed, the port is hidden between the two halves of the mobile electronic device. When the mobile electronic device is opened, the port is still hidden underneath the battery door. A seal underneath the removable battery door enables this porting scheme to work with good audio.

By utilizing an existing PCB in the flip assembly of the mobile electronic device, a pattern of copper traces can be laid out to detect a user's finger gestures without impacting the device's size. This allows for an additional input with no additional cost for a sensor or increased size. This method and stack-up is applicable to a reverse-clam type of form factor as well as traditional clam devices, traditional slider devices, qwerty (QWERTY) side-slide devices, or any other form-factor where the display is housed in a separate portion of the housing that is desired to achieve optimal thinness.

The mobile electronic device can comprise a base and a movable portion, such as a flip or slide that is operatively connected to the base, such as by a hinge or slide. The movable portion is movable from an open position to a closed position and vice versa. The mobile electronic device can further comprise: a keypad on the outward surface of said base, a touchscreen comprising a display on the outward surface of the movable portion and a touchpad on the inward surface of the movable portion. The touchpad can comprise a touchpad sensor and preferably comprises a capacitance touchpad for detecting the position of the movable portion. The touchpad can also comprise a navigator for navigating the display. The touchpad can be positioned opposite and operatively connected to the display. Desirably, the touchpad is positioned to be touched by the user without blocking viewing of the display.

The novel mobile electronic device can have a printed circuit board in the movable portion and a pattern of capacitive touch traces can be embedded within the printed circuit board for detecting a user's finger gestures without increasing the size of the mobile electronic device.

In the preferred embodiment, the mobile electronic device has: a speaker and a battery in the base, a battery door positioned along the inward surface of the base for accessing the battery, a speaker port hidden underneath the battery door for emitting sound from the speaker, and an acoustic seal that is positioned underneath the battery door for sealing the speaker port for audio enhancement.

This invention as described in the specification and patent claims achieves excellent results.

A more detailed explanation of the invention is provided in the following detailed descriptions and appended claims taken in conjunction with the accompanying drawings.

BRIEF DESCRIPTION OF THE DRAWINGS

FIG. 9 is a back view of the mobile electronic device shown in the fully open position and illustrating the speaker port.

FIG. 10 is an enlarged back view of part of the mobile electronic device shown in the open position and illustrating the acoustic seal and battery door.

DETAILED DESCRIPTION OF THE INVENTION

Figure 1:
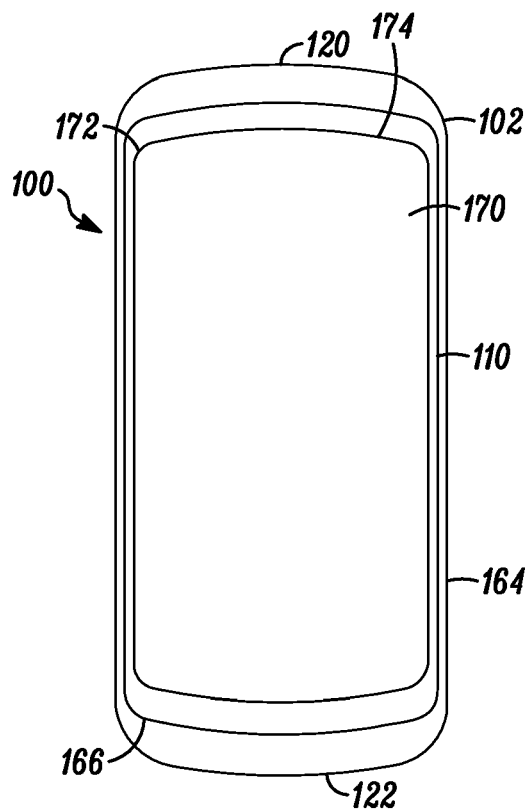
FIG. 1 is a front view of a mobile electronic device in accordance with principle of the present invention of the present disclosure shown in a closed position in a tablet mode in which the flip and base are positioned at a zero (0) degree angle relative to each other.

The following is a detailed description and explanation of the preferred embodiments of the invention and best modes for practicing the invention.

Referring to the drawings, a mobile electronic device 100 can comprise a flip 102 which can be pivotally connected by a hinge 104 to a base 106. The flip can be pivotable from a closed position, to partially open positions and to a fully open position and vise versa. The mobile electronic device can be movable to different orientations for providing different functionality in the partially open positions.

The mobile electronic device can be: a flip phone, slider phone, portable networking device, internet communications device, clamshell device, radio telephone, cellular phone, mobile phone, smart phone, portable gaming device, personal digital assistant, wireless e-mail device, two-way pager, handheld electronic device, or combinations of the preceding. The mobile electronic device preferably is of a compact size for readily fitting in a shirt pocket, pants pocket, suit pocket, and/or purse.

The base and the flip each can have an outward (outer) surface 108 or 110, an inward (inner) surface 111, 112, 113, or 114, edges comprising longitudinal sides 115, 116, 117 or 118 in a portrait mode, and lateral ends 119, 120, 121 or 122 in a portrait mode.

Figure 12:
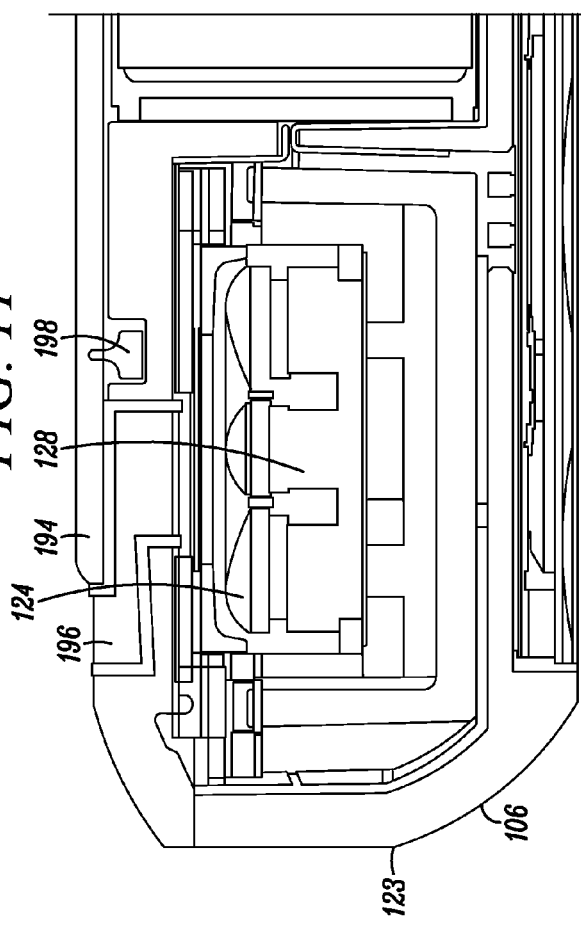
FIG. 12 is an enlarged cross-sectional side view of a portion of the base of the mobile electronic device.

The base has a transceiver housing 123 (xcvr) and defines an internal base compartment 124 (FIG. 12) that can provide a cavity for containing a battery 126 and a speaker 128.

The base can have a keypad assembly 132 which can comprise a housing (keypad housing) 134 with a rim 136 that can provide a periphery that can surround or partially surround a keypad 138. The keypad assembly can have backlighting below the keypad. The keypad can be positioned on the outward surface of the base and can face downwardly when the flip is in the partially open position, such as in a media viewing mode. The keypad can be partially transparent, clear and light transmissive. The keypad can comprise: a qwerty keypad, capacitive keypad, keyboard, alpha numeric keys, a base touchscreen, or combinations of the preceding. The keypad can have a capacitive touch surface. The keypad can occupy most, preferably 70% to 99%, of the outward surface of the base.

The keypad can also comprise a moldprint keypad with graphics on the underside of the keypad or on a layer below the keypad. Such graphics for the keypad can include one or more of the following: text, numbers, characters, alpha numeric images, color graphics, black graphics, moving graphics, animation, video clips, logos, photographs, decorations, designs, symbols, and other images.

In one embodiment, the keypad comprises a tactile qwerty keypad positioned over a series of switches (domes) which a user can depress. The keypad may also change or transform in response to the press of a button or mode change in the user interface from a tactile qwerty keypad to a keypad with a disabled area and a touchable area for user input.

A display structure assembly 164 can provide a display module 166 with display housing 168 and a touchscreen display 170 on the outward surface of the flip. The display can be positioned opposite the keypad when the flip is in a closed position in a tablet mode. The display can face upwardly with and in proximity to the keypad when the flip in a fully open position in an e-mail/text mod. The display can be positioned at an angle of inclination when the flip is in a partially open position in a media viewing mode. The display can occupy most, preferably 70% to 99%, of the outward surface of the base.

The display can comprise a touchscreen comprising a touch sensitive lens 172 with an input lens surface 174. Touch sensors can be integrated to either the input surface or the opposite surface of the lens. The touch sensor generates a signal in response to a manually engageable haptic input from a user when the user touches the lens with a finger to emit light forming an image on the lens. The touchscreen display can be can be transparent, clear and light transmissive and can comprise a capacitive touchscreen, an organic light emitting display (OLED) or a liquid crystal display (LCD).

A touchpad assembly 186 can provide a touchpad sensor 202 with a touchpad cover 204. The touchpad assembly can also have a housing 188 (touchpad housing) and a bezel (touchpad bezel) which can provide a back plate (touchpad backplate), with or without a rim, for holding the touchpad, such as with adhesive. A touchpad gasket can be positioned between and sealing the touchpad housing to a peripheral portion of the touchpad.

The touchpad can be positioned on the inward surface of the flip at a location which is transversely opposite of the display. The touchpad can be a capacitive touchpad for detecting the position of the flip. The touchpad can provide navigation control within the user interface (UI) on the display, such as, but not limited to: highlighting a web link on the display, scrolling through text on the display, clicking to enter a command on the display, and/or implementing a mouse cursor on the touchscreen. The touchpad can also comprise one or more of the following: a zoom control, a magnifier, scroll bar, scroll control, a slide bar in a browser window, enter key, command key, shift key, visual selector, cursor, and/or pointer. The touchpad can occupy a substantial portion, such as from 25% to 75%, of the inward surface of the flip. In the illustrative embodiment, the touchpad is smaller and occupies a smaller area than either the touchscreen display or the keypad. The flip assembly can also have a slot providing a supplemental audio port 193.

Advantageously, the touchpad is positioned to be touched by the user without blocking viewing of the display when the flip is in the partially open and fully open positions. The touchpad can be hidden and inaccessible when the flip is in the closed position.

A removable battery door 194 (FIGS. 9 and 12) can be positioned along the inward surface of the base at a location transversely opposite of the keypad. The removable battery door can be substantially hidden and inaccessible when the flip is in the closed position.

A speaker port 196 (FIGS. 9 and 12) can be hidden underneath the removable battery door. The speaker port can provide an acoustical passageway for emitting sound from the speaker.

An acoustic seal 198 (FIGS. 9, 10 and 12) can be positioned underneath the battery door for sealing the speaker port and directing travel of sound from the speaker underneath the battery door to produce enhanced audio.

Figure 13:
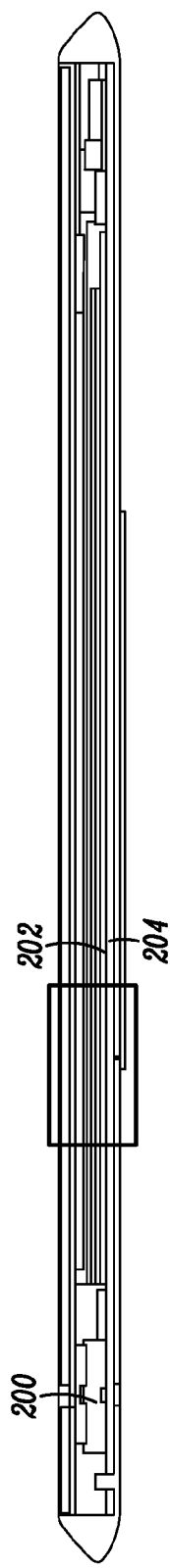
FIG. 13 is an enlarged cross-sectional side view of a portion of the flip of the mobile electronic device and illustrating a printed circuit board with capacitive touch traces.
Figure 14:
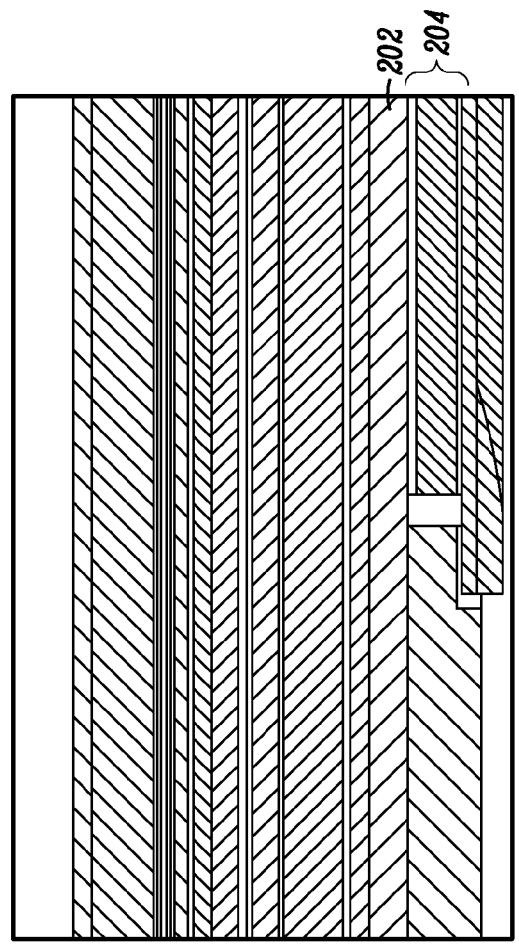
FIG. 14 is greatly enlarged cross-sectional side view of the rectangular portion FIG. 13 and illustrating the printed circuit board with capacitive touch traces and non-conductive/decorative layers to bring the touch surface flush with the housing.

The flip can have an internal flip compartment that provides a cavity to contain a printed circuit board 200 (PCB) (FIG. 13) in the flip. A pattern of capacitive touch traces 202 (FIGS. 13 and 14) or wires can be embedded within the printed circuit board for detecting a user's finger gestures without increasing the size of the mobile electronic device. Non-conductive decorative layers 204 can be provided to bring the touch surface of the touchpad flush with the touchpad housing.

The hinge can comprise a friction hinge which can have a radial range of motion of 180 degrees or more and can have detents at both ends of travel. This can be achieved through the use of an asymmetrical cam in conjunction with a single tab on a follower. The friction hinge can allow a full 360 degree range of motion with any number of detents at any radial position. The friction hinge also provides a dependable and inexpensive way to produce a tilt in the display of a qwerty flip device or in a qwerty mode.

The asymmetric cam can have a cam face which provides an asymmetrical cam surface upon which the follower rides. The asymmetrical cam surface can have two or more detents including, but not limited to, a first detent at a zero (0) degree position for closing the electronic device and a second detent at a position at or beyond 180 degrees so that the electronic device can be partially opened and subsequently pivoted to a fully opened position with the flip opened at an angle at or beyond 180 degrees relative to the base. The detents of the asymmetrical cam can be separated by 210 degrees to allow for 190 degrees of travel and 10 degrees of preload at both ends of travel. In some circumstances, it may be desirable that the cam has more than two detents. The asymmetrical cam can have diametrically opposite curved surfaces diametrically opposite generally flat planar surfaces.

Figure 5:
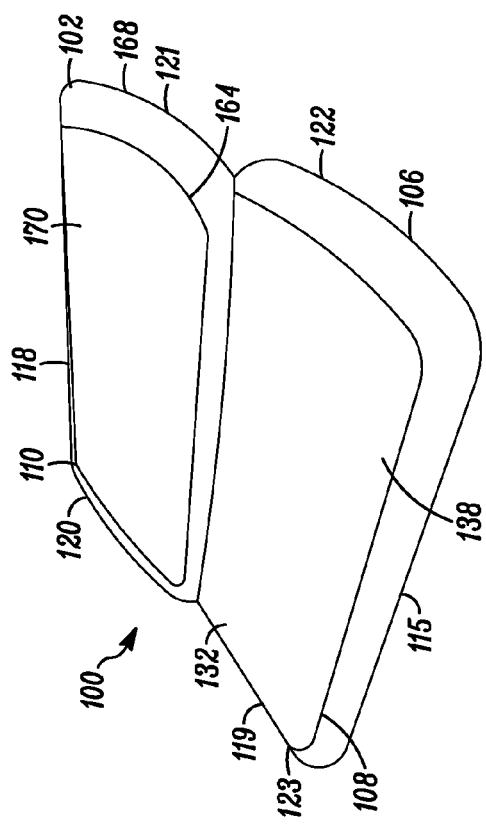
FIG. 5 is a perspective view of the mobile electronic device shown in a fully open position in a text-entry mode.
Figure 6:
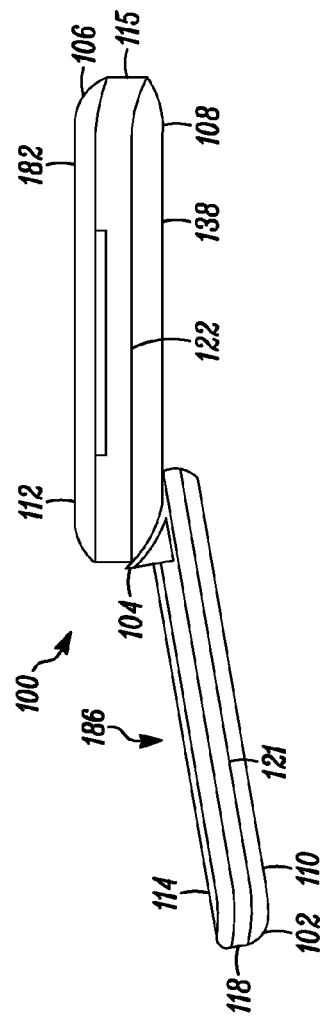
FIG. 6 is a side view of the mobile electronic device shown in the fully open position in the text-entry mode.
Figure 7:
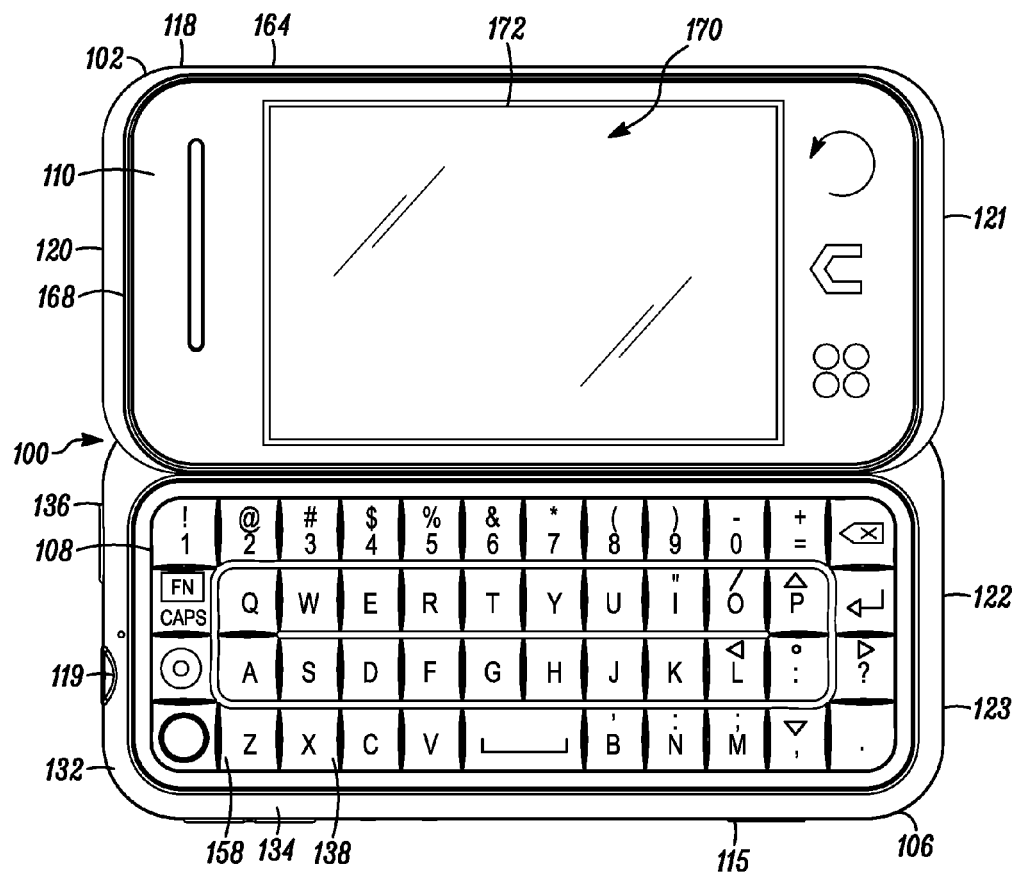
FIG. 7 is a front view of the mobile electronic device shown in the fully open position.
Figure 8:
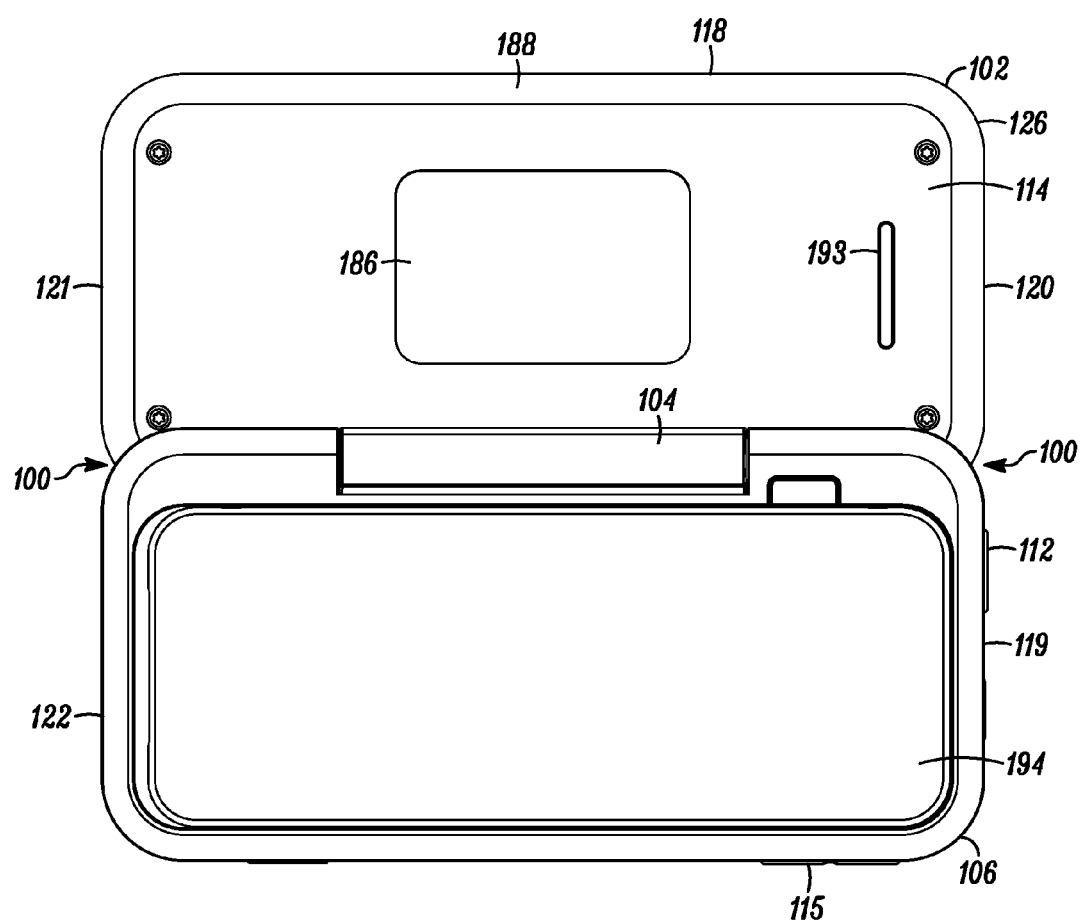
FIG. 8 is a back view of the mobile electronic device shown in the fully open position.
Figure 11:
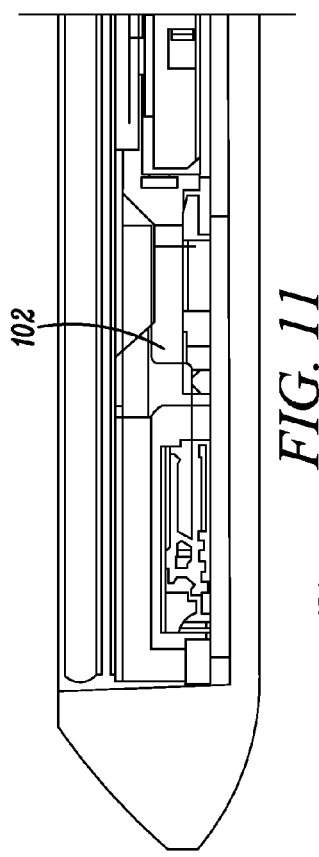
FIG. 11 is an enlarged cross-sectional side view of a portion of the flip of the mobile electronic device.

Advantageously, the friction hinge provides specific positions of the electronic device including: (1) a closed position in a tablet mode as shown in FIGS. 1 and 2 in which the flip and base are positioned at a zero (0) degree angle relative to each other at a closing torque, (2) a fully open position in a qwerty mode as shown in FIGS. 5 and 6 in which the flip and base are positioned at a open angle at or substantially greater than about 180 degrees at a fully open qwerty torque, and (3) a partially open position in a media viewing mode as shown in FIGS. 3 and 4 in which the flip and base are positioned at an open angle substantially greater than the closed position but substantially less than fully open position at a torque less than the closing torque and the fully open torque.

In the preferred embodiment, the partially open position in the media viewing mode ranges from 70 degrees to 100 degrees and the fully open position is 180 degrees to 190 degrees in the qwerty mode.

Figure 2:
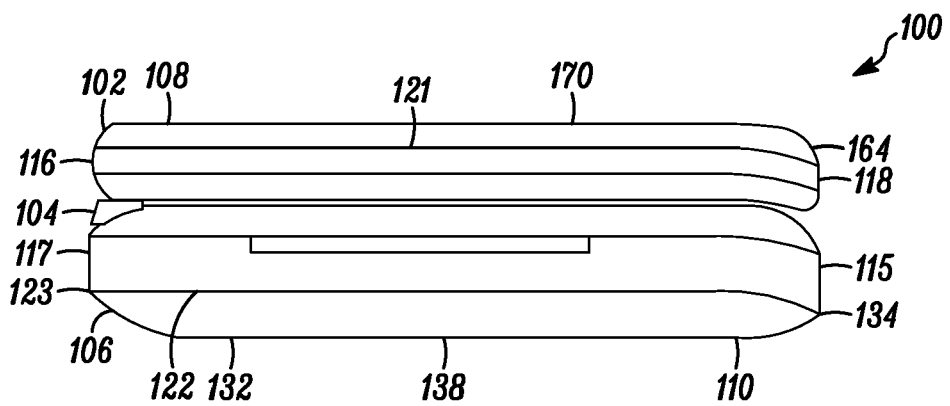
FIG. 2 is a side view of the mobile electronic device shown in the closed position in the tablet mode.

In operation and use, in the tablet mode of FIGS. 1 and 2, the flip is held closed using the first detent in the cam. In the closed position, the interior inwardly facing inward surfaces of the flip and base abut and face each other so as to be hidden from view in the interior of the electronic device and are not accessible to the user. In the closed position, the exterior outer surfaces of the flip and base are visible and accessible to the user.

Figure 3:
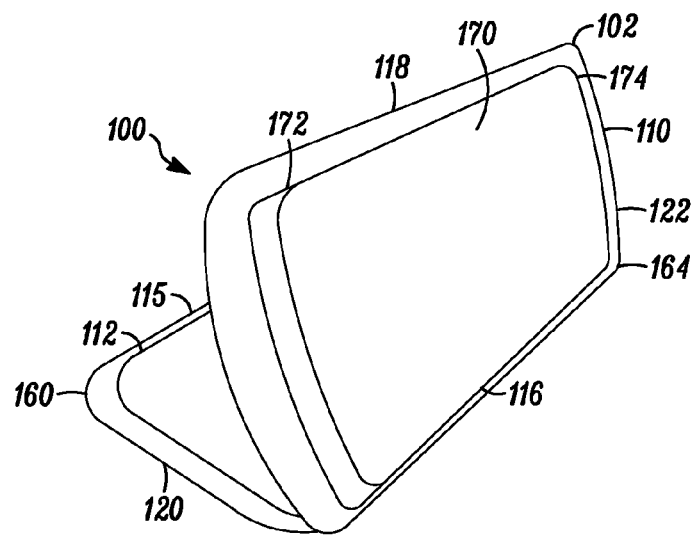
FIG. 3 is a perspective view of the mobile electronic device shown in a partially open position in a media viewing mode.
Figure 4:
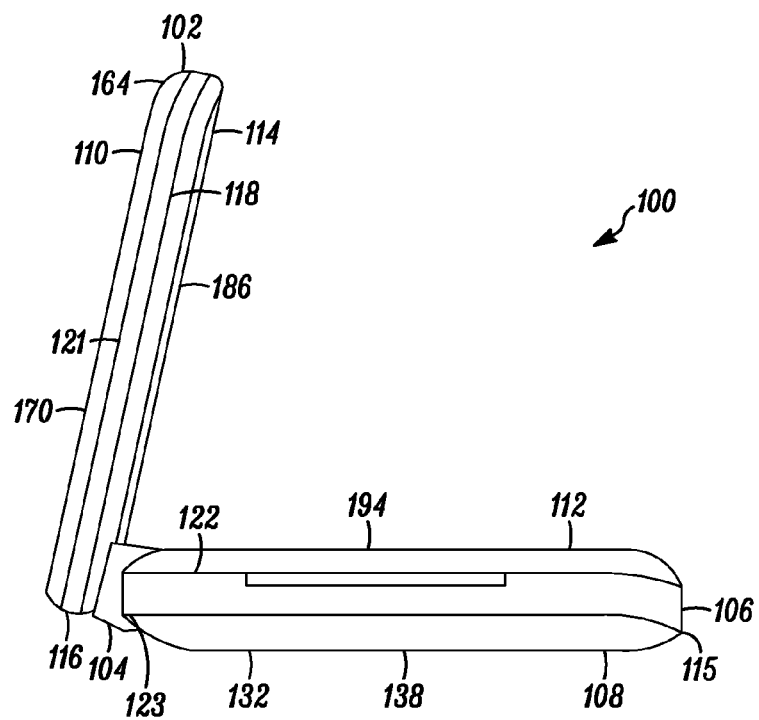
FIG. 4 is a side view of the mobile electronic device shown in the partially open position in the media viewing mode.

In the media viewing mode as shown in FIGS. 3 and 4, the user sets of the desired angle of the flip and the flip is then held open with a holding torque produced by the friction between the asymmetrical cam and the follower. In the partially open, media viewing mode, the user sets the desired angle of the flip to access the inward surfaces of the flip and base.

In the fully open position as shown in FIGS. 5 and 6, the flip is held open at about 190 degrees using the second detent in the asymmetrical cam. In the fully open position the user can readily and fully access the touchpad, keypad, battery door and touchscreen display.

Among the many advantages of the mobile electronic device are:
1. Superior capability.
2. Superb performance.
3. Enhanced audio.
4. Excellent navigation, scrolling, zooming and magnification.
5. Better detection of finger gestures.
6. Outstanding ability to detect the orientation, angle, position and mode of the flip.
7. Reliable.
8. Comfortable.
9. Light weight.
10. Portable.
11. User friendly.
12. Easy to use.
13. Durable
14. Economical.
15. Attractive.
16. Efficient.
17. Effective.

Although embodiments of the invention have been shown and described, it is to be understood that various modifications, substitutions, and rearrangements of parts, components, and/or process (method) steps, as well as other uses of the mobile electronic device can be made by those skilled in the art without departing from the novel spirit and scope of this invention.

What is claimed is:

1. A mobile electronic device, comprising:
    a base defining a cavity providing a battery compartment for containing a battery;
    a movable portion operatively connected to the base, said movable portion being selected from the group consisting of a flip and a slide, said movable portion being movable from an open position to a closed position and vice versa;
    said base and said movable portion each having an outward surface and an inward surface;
    a keypad on the outward surface of said base;
    a battery door on the inward surface of the base for access to the battery in the cavity of the base in the open position;
    a touchscreen display on the outward surface of the movable portion;
    a touchpad on the inward surface of the movable portion, said touchpad being positioned transversely opposite of said touchscreen display;
    said touchscreen display on the outward surface of the moveable portion and said keypad on the outward surface of said base face outwardly and away from each other in the closed position and are visible and accessible to a user in the closed position; and
    said touchpad on the inward surface of the moveable portion and said battery door on the inward surface of the base face inwardly and towards each other in the closed position and are hidden from view and are inaccessible to the user in the closed position.

2. A mobile electronic device in accordance with claim 1 wherein said flip is pivotably connected by a hinge to said base, said base comprising lateral ends and elongated longitudinal sides, said longitudinal sides being longer than said lateral ends, and said hinge is positioned along a middle portion of one of the longitudinal sides so that said flip is pivotable in a landscape mode.

3. A mobile electronic device in accordance with claim 1 wherein said slide comprises a slidable portion and is slidably connected to said base.

4. A mobile electronic device in accordance with claim 1 wherein said touchpad is selected from the group consisting of a touchpad with a touchpad sensor and a capacitive touchpad for detecting the position of the movable portion.

5. A mobile electronic device in accordance with claim 1 including a printed circuit board in said movable portion containing a pattern of capacitive touch traces embedded within said printed circuit board for detecting a user's finger gestures without increasing the size of the mobile electronic device.

6. A mobile electronic device in accordance with claim 1 wherein:
    said touchpad operatively connected to said touchscreen display; and
    said touchpad provides functionality for navigating a user interface on said touchscreen display.

7. A mobile electronic device in accordance with claim 1 wherein said touchpad is positioned to be touched by the user without blocking viewing of said touchscreen display.

8. A mobile electronic device in accordance with claim 1, wherein:
    said mobile electronic device is selected from the group of consisting of: a flip phone, slider phone, portable networking device, internet communications device, clamshell device, radio telephone, cellular phone, mobile phone, smart phone, portable gaming device, personal digital assistant, wireless e-mail device, two-way pager, handheld electronic device, and combinations thereof; and said mobile electronic device is of a compact size for readily fitting in a shirt pocket, pants pocket, suit pocket, and/or purse.

9. A mobile electronic device in accordance with claim 1 including:

a speaker in said base;

a speaker port hidden underneath said battery door for emitting sound from said speaker; and an acoustic seal positioned underneath said battery door for sealing said speaker port for audio enhancement.

10. A mobile electronic device comprising:

a base defining a compartment for containing a battery and speaker;

a flip pivotally connected to said base, said flip being pivotable from a closed position in a tablet mode, to a partially open position in a media viewing mode and to a fully open position in a text-entry mode and vice versa;

said base and said flip each having an outward surface and an inward surface;

a keypad on the outward surface of said base, said keypad being selected from the group consisting of a qwerty keypad, capacitive keypad, keyboard, alpha numeric keys, and a base touchscreen, and said keypad facing downwardly when said flip is in said partially open position;

a touchscreen display on the outer surface of said flip, said touchscreen display being positioned opposite said keypad when said flip is in the closed position in the tablet mode so that both the touchscreen display and said keypad are visible and accessible to a user in the closed position in the tablet mode, said touchscreen display being positioned in proximity to said keypad when said flip in a fully open position, in the text-entry mode, and said touchscreen display being positioned at an angle of inclination when said flip is in a partially open position in the media viewing mode;

a touchpad on the inward surface of said flip and positioned transversely opposite of said touchscreen display, and said touchpad being hidden and inaccessible to the user when said flip is in said closed position in the tablet mode;

a removable battery door positioned along the inward surface of said base and positioned transversely opposite of said keypad, and said removable battery door being substantially hidden and inaccessible to the user when said flip is in the closed position in the tablet mode;

said touchpad, keypad, battery door and touchscreen display being accessible by the user in the fully open position in the text-entry mode, a speaker port hidden underneath said removable battery door, said speaker port providing an acoustical passageway for emitting sound from said speaker; and an acoustic seal positioned underneath said battery door for sealing said speaker port and directing travel of sound from the speaker underneath said battery door to produce enhanced audio.

11. A mobile electronic device in accordance with claim 10 wherein said touchpad is positioned to be touched by the user without blocking viewing of said display, and said touchpad is selected from the group consisting of a touchpad with a touchpad sensor and a capacitive touchpad for detecting the position of said flip.

12. A mobile electronic device in accordance with claim 10 including a printed circuit board in said flip containing a pattern of capacitive touch traces or wires embedded within said printed circuit board for detecting a user's finger gestures without increasing the size of the mobile electronic device.

13. A mobile electronic device in accordance with claim 10 wherein:

said touchscreen display comprises a user interface; and said touchpad comprises a touchpad sensor comprising a navigator which when touched by the user translates to motion within the user interface on said touchscreen display.

14. A mobile electronic device in accordance with claim 13 wherein said motion is selected from the group consisting of highlighting a web link on said display, scrolling through text on said display, tapping or clicking to enter a command on said display, implementing a mouse cursor on the user interface in response to motion of a user's finger on said touchpad, and combinations thereof.

15. A mobile electronic device in accordance with claim 10, wherein:

said mobile electronic device is selected from the group of consisting of: a flip phone, portable networking device, internet communications device, clamshell device, radio telephone, cellular phone, mobile phone, smart phone, portable gaming device, personal digital assistant, wireless e-mail device, two-way pager, handheld electronic device, and combinations thereof; and said mobile electronic device is of a compact size for readily fitting in a shirt pocket, pants pocket, suit pocket, and/or purse.

16. A mobile electronic device comprising:

a base defining a compartment for containing a battery and speaker;

a flip pivotally connected to said base, said flip being pivotable from a closed position in a tablet mode, to a partially open position in a media view mode and to a fully open position in an e-mail/text-entry mode and vice versa;

said base and said flip each having an outward surface and an inward surface;

a backlit keypad on the outward surface of said base with back lighting, said backlit keypad selected from the group consisting of a qwerty keypad, capacitive keypad, keyboard, alpha numeric keys, and a base touchscreen, and said backlit keypad facing downwardly when said flip is in said partially open position in a media viewing mode;

a touchscreen display comprising a touchscreen on the outer surface of said flip, said touchscreen display being positioned opposite said keypad when said flip is in a closed position in the tablet mode, said display facing upwardly with and in proximity to said keypad when said flip in a fully open position in the e-mail/text-entry mode, and said touchscreen display being positioned at an angle of inclination when said flip is in a partially open position in the media viewing mode;

a touchpad on the inward surface of said flip and positioned transversely opposite of said touchscreen display, said touchpad comprising a capacitive touchpad for detecting the position of said flip, said touchpad is positioned to be touched by a user without blocking viewing of said touchscreen display when said flip is in said partially open in the media viewing mode and in said fully open position in the e-mail/text-entry modes; and said touchpad being hidden and inaccessible to the user when said flip is in said closed position in the tablet mode;

a removable battery door positioned along the inward surface of said base and positioned transversely opposite of said keypad, and said removable battery door being substantially hidden from view and inaccessible to the user when said flip is in the closed position in the tablet mode and said removable battery door being accessible to the user for accessing the battery when the flip is in the fully open position in the e-mail/text-entry mode;

said touchscreen display on the outward surface of the moveable portion and said keypad on the outward surface of said base face outwardly and away from each other in the closed position in the tablet mode and are visible and accessible to a user in the closed position in the tablet mode;

said touchpad on the inward surface of the moveable portion and said battery door on the inward surface of the base facing inwardly and towards each other in the closed position in the tablet mode and are hidden from view and are inaccessible to the user in the closed position in the tablet mode;

said touchpad, keypad and touchscreen display being accessible to the user in the fully open position in the e-mail/text-entry mode;

a speaker port hidden underneath said removable battery door, said speaker port providing an acoustical passageway for emitting sound from said speaker; and an acoustic seal slidably positioned underneath said battery door for sealing said speaker port and directing travel of sound from the speaker underneath said battery door to produce enhanced audio.

17. A mobile electronic device in accordance with claim 16 including a printed circuit board in said flip containing a pattern of capacitive touch traces embedded within said printed circuit board for detecting a user's finger gestures without increasing the size of the mobile electronic device.

18. A mobile electronic device in accordance with claim 16 wherein:

said touchscreen display comprises a user interface; and said touchpad comprises a touchpad sensor comprising a navigator which when touched by the user translates to motion within the user interface on said touchscreen display; and said motion is selected from the group consisting of highlighting a web link on said display, scrolling through text on said display, tapping or clicking to enter a command on said display, implementing a mouse cursor on the user interface in response to motion of a user's finger on said touchpad, and combinations thereof.

19. A mobile electronic device in accordance with claim 16, wherein:

said mobile electronic device is selected from the group of consisting of: a flip phone, portable networking device, internet communications device, clamshell device, radio telephone, cellular phone, mobile phone, smart phone, portable gaming device, personal digital assistant, wireless e-mail device, two-way pager, handheld electronic device, and combinations thereof; and said mobile electronic device is of a compact size for readily fitting in a shirt pocket, pants pocket, suit pocket, and/or purse.

* * * * *